United States Patent
Lambert et al.

(10) Patent No.: US 6,367,016 B1
(45) Date of Patent: *Apr. 2, 2002

(54) METHOD FOR CONTROLLING ACCESS TO ELECTRONICALLY PROVIDED SERVICES AND SYSTEM FOR IMPLEMENTING SUCH METHOD

(75) Inventors: Howard Shelton Lambert, Southampton; James Ronald Lewis Orchard, Winchester, both of (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,315

(22) Filed: Jun. 9, 1998

(30) Foreign Application Priority Data

Sep. 19, 1997 (GB) ................................................ 9719881

(51) Int. Cl.[7] ............................................. G06F 11/30
(52) U.S. Cl. ........................................ 713/185; 713/186
(58) Field of Search ................................. 713/185, 186

(56) References Cited

U.S. PATENT DOCUMENTS

| | | | |
|---|---|---|---|
| 4,757,534 A | * 7/1988 | Matyas et al. | 380/25 |
| 5,048,085 A | * 9/1991 | Abraham et al. | 380/23 |
| 5,193,114 A | * 3/1993 | Moseley | 380/23 |
| 5,276,735 A | 1/1994 | Boebert | 380/21 |
| 5,485,519 A | * 1/1996 | Weiss | 380/23 |
| 5,623,637 A | * 4/1997 | Jones et al. | 395/491 |
| 5,790,674 A | * 8/1998 | Houvener et al. | 380/23 |
| 5,987,134 A | * 11/1999 | Shin et al. | 380/25 |
| 5,999,629 A | * 12/1999 | Heer et al. | 380/21 |

FOREIGN PATENT DOCUMENTS

WO   WO97/29416   8/1997

OTHER PUBLICATIONS

Menezes et al, Handbook of Applied Cryptography, Oct. 17, 1996, pp. 387.*

* cited by examiner

*Primary Examiner*—Thomas R. Peeso
(74) *Attorney, Agent, or Firm*—Thomas A. Beck; Louis P. Herzberg

(57) ABSTRACT

The security and integrity of card initiated transactions are improved by encrypting processes involved in such transactions and controlling access to the processes by developing decryption keys partially from data derived from a card presented by an intending user and partially from personal data supplied by the user. In an embodiment a hierarchy of security levels provides for users of different authority to access selected processes.

14 Claims, 3 Drawing Sheets

METHOD FOR CONTROLLING ACCESS TO ELECTRONICALLY PROVIDED SERVICES AND SYSTEM FOR IMPLEMENTING SUCH METHOD

FIELD OF THE INVENTION

This invention relates generally to the control of access to electronically provided services and more particularly to the control of access to such services using tokens such as plastic cards.

BACKGROUND OF THE INVENTION

An example of such a service is the dispensing of cash by an automatic teller machine (ATM). Access to facilities provided by the ATM are typically controlled by requiring a user to present a personalised plastic card carrying data on a magnetic stripe to a card reader associated with the ATM. The user is required to key in a personal identification number (PIN) which is used by the system to access data in the card which together with data held in the system relating to the user enables the system to determine whether the requested transaction should be authorised.

The principle has been considerably extended to many types of transactions including the purchase of goods in retail outlets, access to processes on computer networks and the provision of stockbroking services. As the sophistication of the services has increased so has the need for increased flexibility and security in the control of access. For example, it is important that providers of smart card services through retail tills/terminals or ATM's are assured that such services may only be accessed by authorised end-users with a valid card, at a valid till and, where appropriate, under the control of an authorised sales assistant or other operator. It is also desirable to provide an audit trail for each transaction to facilitate the detection of fraud and the settlement of any dispute that may arise from the transaction.

An improved form of plastic card, called the smart card, has recently been developed which by incorporating within it active data processing and storage facilities provides enhanced security and flexibility.

It is an object of the present invention to provide a method of controlling access to electronically provided services and a system for implementing such a method which provides improved security and flexibility. A preferred embodiment enables advantage to be taken of the facilities provided by smart cards.

SUMMARY OF THE INVENTION

According to the invention there is provided a method for controlling access to an electronically provided service comprising the steps of storing one or more application modules, which permit such a service to be delivered, in encrypted form so as to be accessible only under the control of a decryption key and, in response to a request for access to a particular service initiated by presentation of a token by a user, developing a decryption key from token data read from said token together with personal data provided by the user to provide access to the requested service by decryption of the associated application module.

According to a second aspect of the invention there is provided a system for controlling access to an electronically provided service comprising means for storing one or more application modules, which permit such service or services to be delivered, in encrypted form so as to be accessible only under the control of a decryption key, token reading means for accepting a token presented to the system by a user requiring access to a particular service or services, data receiving means for receiving personal data relating to the user, and a key generator adapted to combine data stored in said token with data received by said data receiving means to generate a decryption key to provide access to the requested service.

In a typical system the personal data relating to the user will be a personal identification (PIN) number in which case the data receiving means will be a simple keypad. However in a more advanced system the data may be developed from biometric data read by a reader adapted to recognise particular facial or other characteristics of the user such as fingerprint or hand geometry.

In order to provide an audit trail there may also be developed, at the same time as the generation of the encryption key, data identifying the end user, the card used and any operator involved, together with the date of the transaction and any other information required to establish an audit trail.

The system is preferably organised to operate under the control of an object orientated (OO) programming language and the services are stored in the form of encrypted object orientated "applets".

In a number of applications, particularly where transactions are performed in association with an operator or operators, it is desirable to make provision for access to processes according to the level of authority delegated to the operator or operators involved. In one embodiment of the invention, a set of applications is made available to all operators of check-out tills in a retail environment whilst a further set of applications is available only to supervisors. In another embodiment of the invention different sets of applets may be decrypted according to the authority of an operator as identified when the operator logs on to a particular terminal. In such a system a hierarchy of access levels may be established by associating with each applet a level of access accessible only to operators or users able to satisfy the system that they have authority to access that particular process.

In a preferred system embodying the invention provision is made for accepting smart cards. Advantage is taken of the processing and storage facilities available on the card to perform the key generation on the card itself and, where sufficient processing capacity is available, the decryption itself. The dynamic generation of the decryption key on the smart card provides the considerable security advantage that the personal information on the card relating to the user need never leave the card. Moreover further security advantages may be obtained by generating a key, or set of keys representative of a user's personal level of authority to access particular services, obviating the need to maintain a separate list of operators and their access authorities. Prior systems requiring such a list are vulnerable to breaches of security if such a list is tampered with.

BRIEF DESCRIPTION OF THE DRAWINGS

In order that the invention may be well understood, preferred embodiments thereof will now be described with reference to the accompanying drawings, in which.

DESCRIPTION OF PREFERRED EMBODIMENTS

Figure 1:
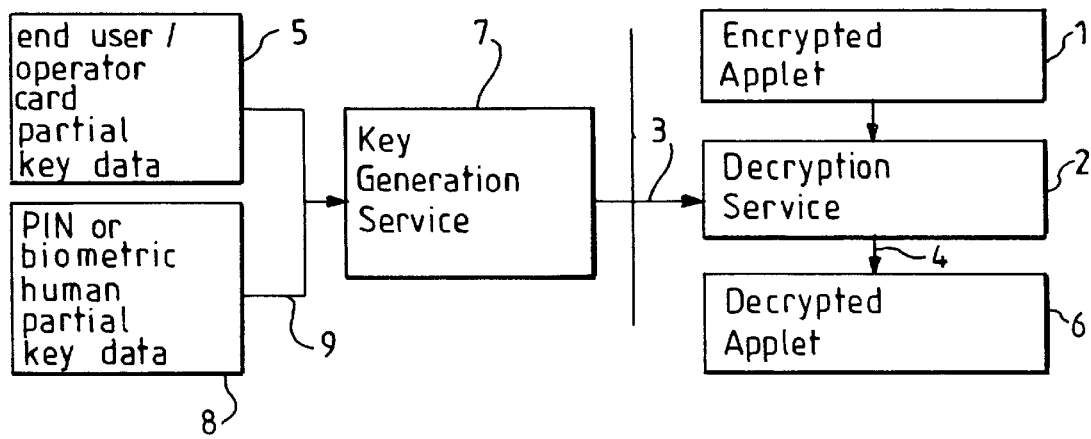
FIG. 1. shows a basic access control system embodying the invention.

Referring to FIG. 1. there is shown in simplified form the basic features of a retail till or automatic teller terminal embodying the invention. An application store (1) is provided to retain in encrypted form those applications which the terminal may be called on to perform, according to the authority of users requesting the application. In a preferred system embodying the invention the applications take the form of object orientated "applets". Such "applets" may be stored in the terminal on a permanent or semi-permanent basis or may be erased and replaced from time to time from a central storage device according to the needs of the terminal. A decryption service module (2), typically a software module arranged to control a processing unit, is provided to decrypt a selected applet under the control of a decryption key provided over a bus (3). The decrypted applet is provided to a register (6) over a bus (4) to control operation of the requested service.

Partial key data (5) is read from a card presented by a user and supplied to a key generator (7). Personalised data such as a personal identification number (PIN) or biometric data is obtained from the user by a reader (8) which supplies this further data over a bus (9) for combination with the data (5) in the key generator (7) to develop a decryption key to be supplied to the decryption service (2) over bus (3).

The preferred system provides for access to be controlled using a smart card. When such a card is presented the key generation service is performed on the card using its processing and data storage facilities, minimising the amount of customer personal data supplied to the terminal and thus enhancing the security of the system. If sufficient processing and storage facilities are available on the card, the security of the system may be further enhanced by performing the decryption process itself using these facilities.

On power up, the till programme invokes an applet controlling operator LOG ON. This applet requires the operator to insert his or her smart card and additionally to provide either PIN or biometric data. Partial data is read from the operator's card and combined with the PIN or biometric data supplied to provide an input to the key generator (7) enabling it dynamically to generate a key or keys permitting the decryption of applets.

The till programme also invokes a LOG ON applet for each customer requesting a service, reading partial key data from his or her card and collecting PIN/biometric data and providing this data as input to the key generating service.

When a service is invoked, for example if the operator initiates a payment, the applet controlling payment is invoked, and the decryption service (2) accesses the key generator which provides:

1. If authorised, a dynamically generated decryption key.
2. Data identifying the end user and the operator and their respective cards.

Figure 2:
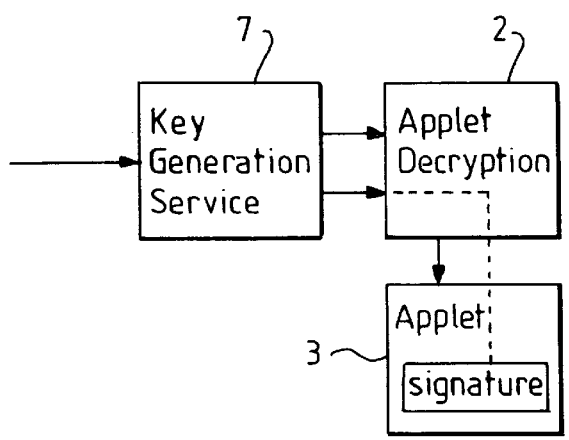
FIG. 2. is a block diagram showing the manner in which an audit trail is developed in the system of FIG. 1.

The decryption service then uses the decryption key to decrypt the applet to perform the requested service. The data identifying the end user and the operator is, as shown in FIG. 2, used to "sign" the transaction, for example by inserting a message authorisation code (MAC) into information sent to the server to which the till is attached. The latter may then log audit trail data for retention with details of the transaction.

Figure 3:
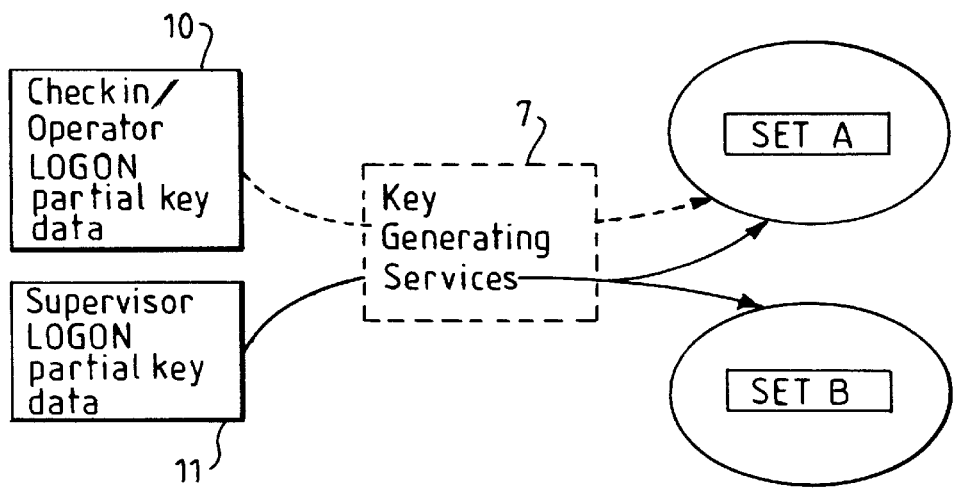
FIG. 3. shows an embodiment of the invention providing two different levels of access according to the authority of the operator or user of a requested service.

In certain applications it may be required that only certain operators may access the till/terminal services, and that the services they can access, are limited to those pre-defined for the operator's authority level and for the business purpose of the till. It may additionally be required that certain operators having a higher level of authority, for example supervisors, may concurrently have access to a till or terminal. FIG. 3. shows an embodiment of the invention which addresses such requirements.

Referring to FIG. 3. there is shown a till/terminal environment with two sets of stored applets (A) and (B), set A being accessible to operators and supervisors of checkout tills and set B only available to supervisors. In the embodiment of FIG. 3. operator log on is controlled by a till program which determines according to business needs whether multiple log ons are permitted, and if so, permits only multiple log ons which conform to certain rules. For example the rule may require that only one valid operator is permitted with one valid supervisor, there being no other valid case of multiple log on.

In the embodiment shown in FIG. 3. partial key data from the till operator is read at (10), and corresponding data from the supervisor at (11). The data is supplied to the key generator (7) to develop a key or keys which control the selection of an application applet from set A or set B or both according to the authority of the check-in operator.

Figure 4:
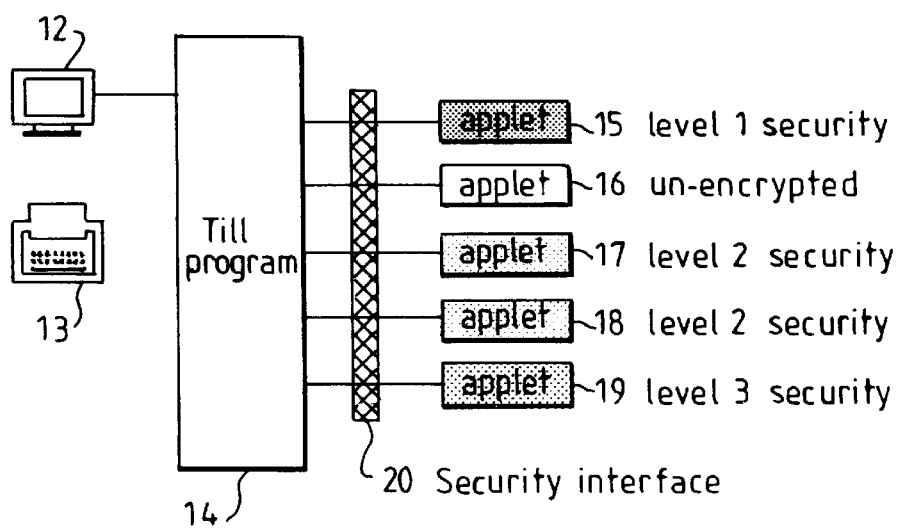
FIG. 4. shows an embodiment of the invention providing a hierarchy of authority according to security levels allocated to various users or operators.

FIG. 4. shows an embodiment which provides a number of levels of authority permitting only operators having a security level matching or exceeding a pre-determined threshold to execute a classified applet.

Referring to FIG. 4., a checkout terminal includes a display (12) and a console (13) operating under the control of a till program (14) resident in the terminal to process user initiated transactions involving various application modules or applets (15–19). Access to the applets by the till program is regulated by a security interface (20) which includes a key generator and decryption facilities as already described with reference to FIG. 1. As described with reference to FIG. 1., when a till operator logs on at the console with a personal smart card that stores their details together with a partial decryption key, the remainder of the key, for example a personal identification number (PIN) is entered at the console (13). According to a first embodiment, a set of decryption keys is derived from this token data and personal data, the set of keys defining the security level of the operator as described below.

In the first embodiment, the key generator accepts as input partial key data comprising 'secret' data from the user's SmartCard and personal data such as a password from the user. It uses this data to determine the user's authority level and generates a set of keys. The data/service which the user is attempting to access is held in encrypted form. For the access to be successful, one of the set of keys dynamically generated has to successfully decrypt the data. This data could be symmetrically encrypted Java classes where the key generated is the symmetric key needed to decrypt the class into standard bytecodes.

In a particular example implementation, the key generator is designed to use standard symmetric encryption and modulo arithmetic. Consider the key parts as integers A and B, where the modulus of (A×B) can be X, Y or Z. X, Y and Z can be used to indicate authority level, and be synonymous with the secret key needed to decrypt the class the user is attempting to access. The generator dynamically generates key(s) from a predefined algorithm it shares with a utility used to create the encrypted classes.

The integers A and B are held in encrypted form on the SmartCard and as a 'password/PIN' issued to the user respectively, so that when this data is operated on by the key generator, it initially decrypts the data, then finds the modulus of the product, uses the modulus to determine the authority level, and provides as output the key or set of keys, where the key (or one of the set) decrypts the class.

This fits well with the supermarket example where there is a three tier hierarchy of authority, checkout operator, supervisor, store manager. The key parts issued to operators when input to the key generator only cause the generator to generate the single key which can decrypt the Java classes for the services which operators are entitled to access. The key parts from supervisor and store manager users, generate keys which can decrypt both the classes to which they have unique access, and the classes of the tier(s) below.

Figure 5:
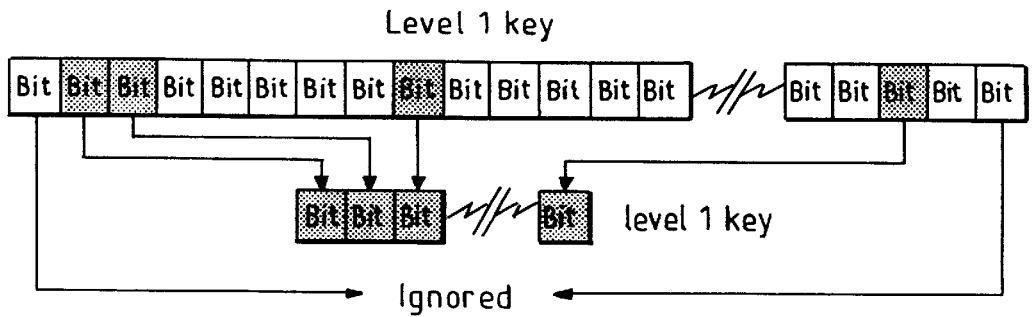
FIGS. 5, 6 and 7 illustrate the development of different levels of decryption key in the embodiment of FIG. 4.
Figure 6:
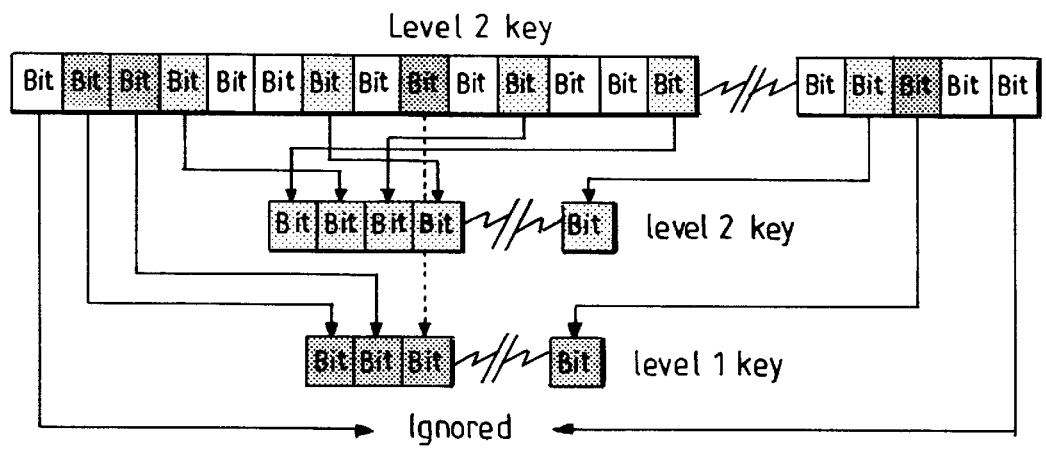
Figure 7:
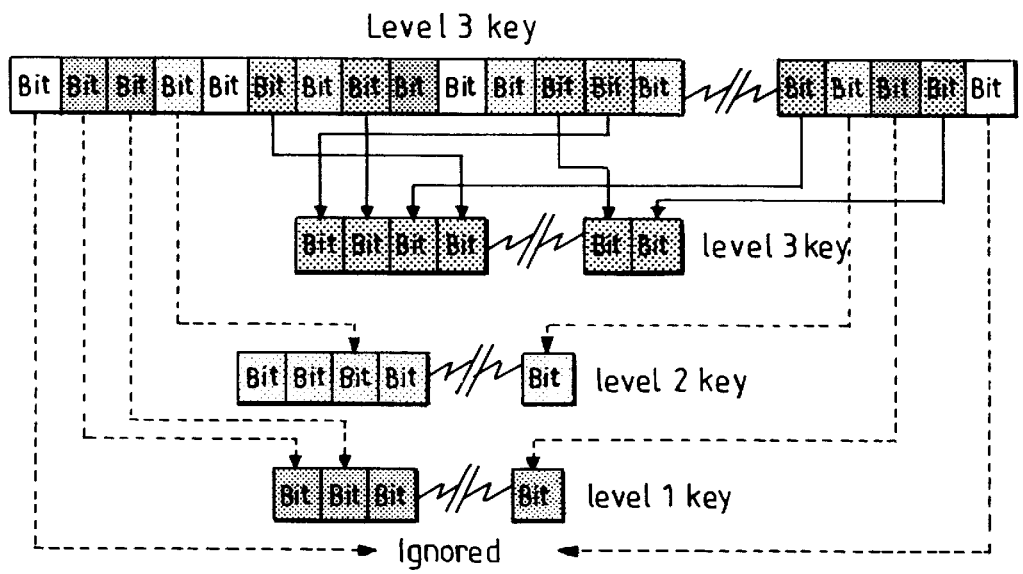

In an alternative embodiment a single key is generated from token data and personal input data at user LOG ON, which key comprises an hierarchical key. From this hierarchical key, a plurality of different decryption keys can be generated according to the particular encryption of the requested application module. The string of bits constituting the decryption key is processed using an algorithm which selects those bits which are to be used for a given security level. Preferably higher security levels include the bit pattern of the lower security levels, permitting a higher level decryption key to be used to decrypt a lower level applet. FIGS. 5–7 provide examples of how the bits used for the security level keys may be inter-mixed in a final decryption key.

In the example shown there are four security levels, 0, 1, 2 and 3. Security level 0 is allocated to applets of such low security that no encryption is required. Level 1 is allocated to the lowest level of encryption, level 2 to a higher level of encryption which includes level 1 and level 3 to a still higher level which includes both levels 1 and 2.

When an applet in encrypted the following data is supplied:
 a user key
 a security level
 a master key The key generator (7) in the security interface (20) operates in accordance with an algorithm which causes bit patterns to be generated which will be used to develop a user de-cryption key which is unique and specific to the user seeking access to an applet and an imbedded code included in the encrypted applet which identifies the security level allocated to that particular applet. Once the keys have been generated any encryption/decryption system may be used.

FIGS. 5–7 illustrate the manner in which keys are developed in the security interface (20) for the various security levels.

Clearly for level 0, the associated applets are in plain language and no key is required. As shown in FIG. 5 the key generation algorithm is arranged to select a group of bits from the bit string developed from the data read by till programme (14) when the user logs on. It will be appreciated that this is a simple example of how the algorithm may operate to select the various bits. In practice various bit transpositions or arithmetic operations may be used to generate the final key.

As shown in FIG. 6. a number of additional bits are selected which, together with the bits already selected for level 1, constitute the level 2 key. Similarly as shown in FIG. 7. further bits are selected to supplement those already selected for level 1 and level 2 to constitute the level 3 key.

The algorithm used to select the bits and the order in which they are re-combined may be different for each key level and may include bits selected from the lower level keys. Thus when a request is made for access to a particular applet the decryption algorithm uses the user key in conjunction with the security level encoded within the encrypted applet to determine the key level. The appropriate bit pattern is selected from the user key, thus permitting the appropriate decryption bit key sequence to be generated. Upon completion of the decryption a user identifier is inserted into the applet so that at execution time the applet can indicate the operator for whom it was decrypted.

While the invention has been described above in relation to transaction terminals it will be appreciated that it is applicable in any situation where access is sought to processes or other potentially sensitive material in the course of a token initiated transaction. For example it may readily be applied to environments such as the Internet in which access is sought to software and may only be granted if the requestor is appropriately authorised.

What is claimed is:

1. A method for controlling access to a set of electronically provided services comprising the steps of:
 storing one or more application modules, which provide each of said services, in encrypted form so as to be accessible only under the control of a decryption key;
 wherein the application modules are grouped into sets of one or more modules, each set being uniquely encrypted in accordance with different respective access authority levels; and
 in response to a request for access to a particular service initiated by presentation of a token by a user, developing a decryption key or a plurality of keys from token data read from said token together with personal data provided by the user, wherein the development of a decryption key or a plurality of keys are is responsive to personal data which is inherently representative of the authority level of the user to develop a decryption key or a plurality of keys which are representative of the authority level of the user, to provide access to the requested service by decryption of the associated application modules, such that the development of a decryption key or set of keys for accessing encrypted application modules is performed without reference to an access control list.

2. The method as claimed in claim 1, in which said personal data is a personal identification (PIN) number entered by said user.

3. The method as claimed in claim 1, in which said personal data is biometric data relating to said user.

4. The method as claimed in claim 1, including the further step of developing, on presentation of a token, data identifying the end user, the card used and any operator involved, whereby an audit trail is established for any transaction involving assess to a service.

5. The method as claimed in claim 1, wherein a key generated from said token data and personal data comprises an hierarchical key including data for generating a plurality of different decryption keys, each for a different set of services which each require a respective authority level for access.

6. The method according to claim 5, wherein a decryption key is generated from said hierarchical key following an interrogation, in response to a service request, of the security access level of one or more encrypted application modules which provide said service, said decryption key being generated only if the user's authority level as represented by the hierarchical key matches the security access level of the one or more encrypted application modules.

7. The method as claimed in claim 1, for use with smart card tokens having data processing and data storage facilities, in which said step of developing decryption key is performed on said token.

8. The method as claimed in claim 7 including the further step of performing the decryption of the associated module on said token.

9. The method as claimed in claim 1 for the use in an object oriented (OO) language environment, in which said application module or modules are stored in the form of encrypted object orient applets.

10. A system for controlling access to an electronically provided service comprising:

- means for storing one or more application modules, which permit such service or services to be delivered, in encrypted form so as to be accessible only under the control of a decryption key;
- token reading means for accepting a token presented to the system by a user requiring access to a particular service or services;
- data receiving means for receiving personal data relating to the user; and
- a key generator adapted to combine data stored in said token with data received by said data receiving means to generate a decryption key or a plurality of keys to provide access to the requested service; wherein the key generator is responsive to personal data which is inherently representative of the authority level of the user to generate a decryption key or a plurality of keys which are representative of the authority level of the user such that the generation of a decryption key or set of keys for access to encrypted application modules is performed without reference to an access control list.

11. The system as claimed in claim 10 in which said personal data is a personal identification (PIN) number.

12. The system as claimed in claim 10 in which said personal data is biometric data relating to said user.

13. The system as claimed in claim 10, for accepting smart card tokens having data processing and data storage facilities in which said key generator is adapted to use such facilities to generate said decryption key on said smart card token.

14. A system according to claim 10, wherein said key generator is adapted to generate an hierarchical key representative of the authority level of the user, said hierarchical key including data for generating a plurality of different decryption keys, each for a different requested services.

* * * * *